(12) United States Patent
Miranda et al.

(10) Patent No.: US 7,756,052 B2
(45) Date of Patent: Jul. 13, 2010

(54) DETERMINING QUALITY OF VOICE CALLS OVER A PACKET NETWORK

(75) Inventors: Carlos M. Miranda, Fort Lauderdale, FL (US); James Karanassos, Manasquan, NJ (US); Galeal Zino, Salisbury, NC (US)

(73) Assignee: ITXC IP Holdings S.a.r.l., Luxembourg (LU)

( * ) Notice: Subject to any disclaimer, the term of this patent is extended or adjusted under 35 U.S.C. 154(b) by 736 days.

(21) Appl. No.: 11/233,473

(22) Filed: Sep. 22, 2005

(65) Prior Publication Data

US 2007/0064616 A1    Mar. 22, 2007

(51) Int. Cl.
*G01R 31/08* (2006.01)
*H04L 12/28* (2006.01)

(52) U.S. Cl. .................. 370/252; 370/250; 370/241; 370/395.21; 370/389; 370/332; 370/516; 370/229; 370/221.01

(58) Field of Classification Search .......... 370/252, 370/250, 241, 395.21, 395.2, 395.1, 389, 370/332, 516, 221.01, 230, 229
See application file for complete search history.

(56) References Cited

U.S. PATENT DOCUMENTS

| | | | | |
|---|---|---|---|---|
| 6,091,806 A | * | 7/2000 | Rasmus et al. | 379/93.29 |
| 6,510,219 B1 | * | 1/2003 | Wellard et al. | 379/221.01 |
| 7,110,422 B1 | * | 9/2006 | Choudhury et al. | 370/516 |
| 2002/0114296 A1 | * | 8/2002 | Hardy | 370/332 |
| 2003/0198204 A1 | * | 10/2003 | Taneja et al. | 370/332 |
| 2005/0249115 A1 | * | 11/2005 | Toda et al. | 370/229 |
| 2007/0159972 A1 | * | 7/2007 | Lanzinger et al. | 370/230 |

* cited by examiner

*Primary Examiner*—Aung S Moe
*Assistant Examiner*—Jamal Javaid
(74) *Attorney, Agent, or Firm*—Kaplan Gilman & Pergament LLP

(57) ABSTRACT

The present invention provides a method for managing a voice call over a packet switched network, in which the voice call is rerouted when voice quality is below a predetermined level. In particular, the voice quality is determined by calculating a parameter representing the voice quality based on information regarding codec, network delay and packet loss. Preferably, R-factor and MOS is calculated based on the information obtained from Cisco CDRs during the call session.

4 Claims, 2 Drawing Sheets

DETERMINING QUALITY OF VOICE CALLS OVER A PACKET NETWORK

BACKGROUND OF THE INVENTION

Figure 1:
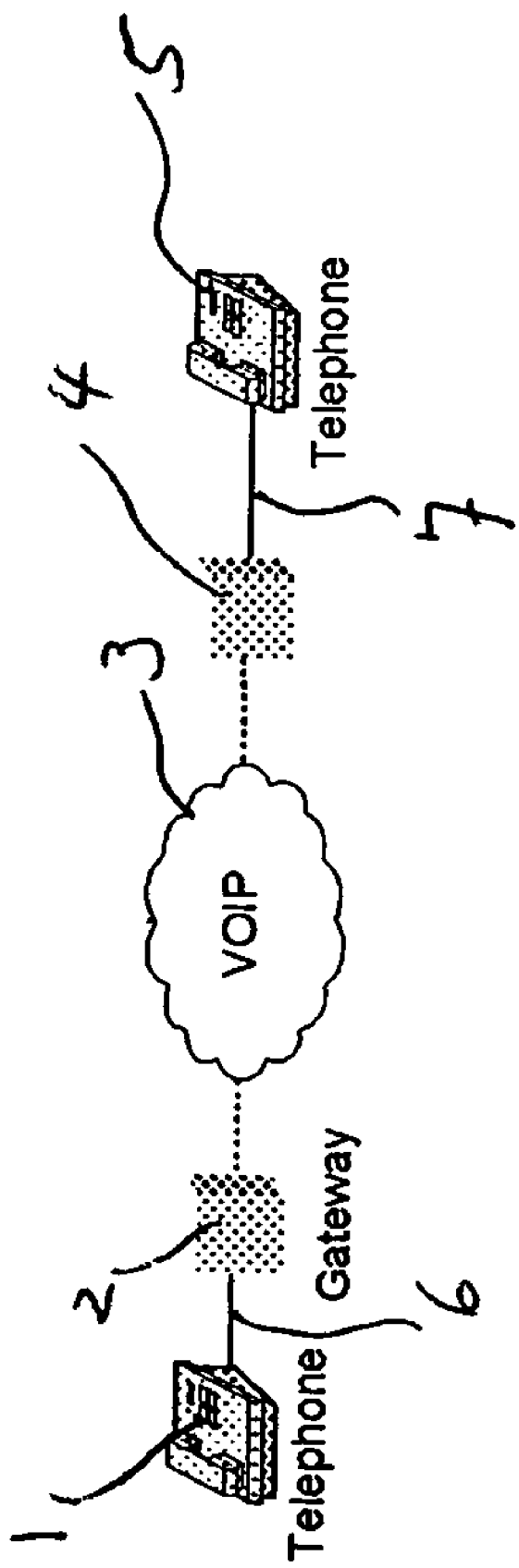

The present invention relates to internet telephony techniques, and more particular, to a method for determining voice quality in a voice call over a packet network and rerouting the voice call accordingly.

With the widespread of broadband Internet connections and the development of Internet telephony techniques, more and more calls are made over the Internet to take advantage of low prices. Though the users understand that they may have to sacrifice some voice quality, voice quality still needs to be kept at an acceptable level.

Currently, the objective methods for measuring voice quality of a voice call over a packet network such as the Internet using a protocol such as VOIP or SIP are mainly categorized into three types: 1) intrusive method: in this method, a reference signal is injected on one side of the network and collected on the other. An assessment of the quality of the network can be made by comparing any differences between the original and transmitted signals. This method gives a true end-to-end quality assessment, however, it is intrusive, requires a receiver to collect the transmitted signal, and does not account for network latency; 2) signal-based non-intrusive method: in this method, the voice quality is assessed by "listening" to ordinary phone calls and applying complex speech pattern recognition. This method is non-intrusive, and gives true end-to-end measurements. However, it does not account for network delay either. Moreover, it is impractical for a large-size fully-meshed network; and 3) parameter-based non-intrusive method: this method assesses voice quality by collecting impairment information from ordinary phone calls on the packet network. It uses the known E-model formula to derive the quality of a call. This method does not give true end-to-end results but only gives the voice quality of the packet network portion of the phone call.

The present invention is directed to the method of the third type as explained above, i.e., the parameter-based non-intrusive method.

SUMMARY OF THE INVENTION

It is an object of the present invention to provide a method for managing a voice call over a packet switched network based on voice quality of the call.

It is another object of the present invention to provide a convenient and effective method in determining voice quality in a voice call over a packet switched network, which is a parameter-based and non-intrusive method.

It is further object of the present invention to provide a method in monitoring the voice quality of a voice call over a packet switched network.

It is another object of the present invention to provide a method of rerouting the voice call when the voice quality is below a predetermined level.

According to the present invention, a method for managing a voice call over a packet switched network is provided, in which the voice call is rerouted when voice quality is below a predetermined level. In particular, the voice quality is determined by calculating a parameter representing the voice quality based on information regarding a codec, network delay and packet loss.

In a preferred embodiment, the information regarding codec, network delay and packet loss is obtained from one or more gateways. Preferably, the gateways comprise at least one Cisco gateway, and the information is obtained from Call Detail Records available in the Cisco gateway.

In a preferred embodiment, the parameter representing the voice quality comprises a Mean Opinion Score (MOS), which is calculated from an R-factor using Equation 1 as below:

$$MOS=1+0.035R+R(R-60)(100-R)7*10^{-6} \quad \text{(Equation 1)}$$

In a preferred embodiment, the R-factor is determined based on the information regarding codec, network delay and packet loss from the following equations, wherein $d_{cdr}$ and the PL are the network delay and the packet loss provided by Cisco CDR, and:

for G.711

$$R=93.2-0.024d-40\ln(1+10PL) \text{ if } d=<177.3 \quad \text{(Equation 2a)}$$

$$R=112.7-0.134d-40\ln(1+10PL) \text{ if } d>177.3 \quad \text{(Equation 2b)}$$

and $d=d_{cdr}/2+94$ for G.729

$$R=82.2-0.024d-44\ln(1+9PL) \text{ if } d=<177.3 \quad \text{(Equation 3a)}$$

$$R=101.7-0.134d-44\ln(1+9PL) \text{ if } d>177.3 \quad \text{(Equation 3b)}$$

and $d=d_{cdr}/2+114$ for G.723

$$R=97.7-0.134d-50\ln(1+8PL) \quad \text{(Equation 4)}$$

and $d=d_{cdr}/2+186$

In another preferred embodiment, the R-factor is determined from the following equations:

for G.711

$$R=100-25\{(1+X^6)^{1/6}-3(1+[X/3]^6)^{1/6}+2\}-[0+40\ln(1+10PL)] \quad \text{(Equation 5)}$$

where $X=\log(d/100)/\log 2$ and $d=d_{cdr}/2+94$ for G.729

$$R=100-25\{(1+X^6)^{1/6}-3(1+[X/3]^6)^{1/6}+2\}-[11+44\ln(1+9PL)] \quad \text{(Equation 6)}$$

where $X=\log(d/100)/\log 2$ and $d=d_{cdr}/2+114$ for G.723

$$R=100-25\{(1+X^6)^{1/6}-3(1+[X/3]^6)^{1/6}+2\}-[15+50\ln(1+8PL)] \quad \text{(Equation 7)}$$

where $X=\log(d/100)/\log 2$ and $d=d_{cdr}/2+186$

BRIEF EXPLANATIONS OF THE DRAWINGS

Figure 2:
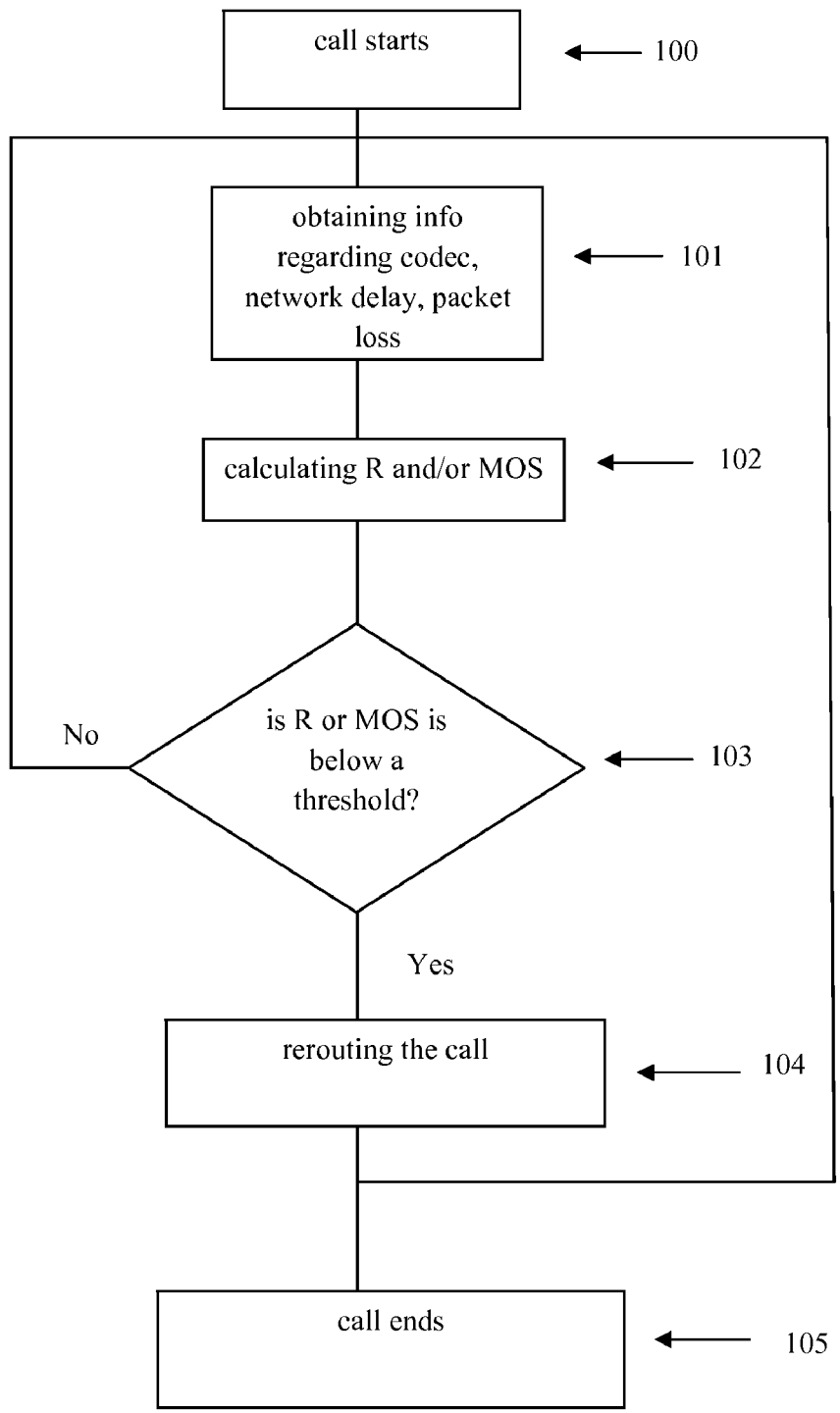

The above and other features and advantages will be clearer after reading the detailed description of the preferred embodiments of the present invention with reference to the accompanying drawings, in which:

FIG. 1 schematically illustrates a voice call over a packet switched network using VOIP protocol;

FIG. 2 is a flow chart showing the embodiment of the method according to the present invention.

DETAILED DESCRIPTION OF PREFERRED EMBODIMENT

FIG. 1 schematically illustrates a scheme of a typical telephone call which is arranged over a packet network using a proper protocol such as VOIP. A call initiated from a calling telephone 1 transmits over a link in a PSTN network 6. The call arrives at an originating gateway 2, where the PSTN call is translated into packet data and routed through a internet 3 to a terminating gateway 4, where the packet data is translated back into a PSTN call forwarded to a destination telephone 5. Therefore, there are two PSTN legs and one VOIP leg to complete the call.

Mean Opinion Score (MOS) is a standard published by the ITU to evaluate a voice call. In addition, the ITU has published other standards to objectively measure call quality, including a non-intrusive, parameter-based objective method called "E-model". The preferred embodiments of the present invention are described with E-model applied to calculate the MOS score to measure the quality for a call through a VOIP network.

As known in the art, MOS can be calculated as a function of the R-factor as follows:

$$MOS=1+0.035R+R(R-60)(100-R)7*10^{-6} \qquad \text{(Equation 1)}$$

Alternatively, the MOS can be obtained from R-factor according to Table 1:

TABLE 1

R-factor and MOS score comparison

| R-Factor | Perceive Quality | MOS |
|---|---|---|
| 90-100 | Best | 4.34-4.5 |
| 80-90 | High | 4.03-4.34 |
| 70-80 | Medium | 3.60-4.03 |
| 60-70 | Low | 3.10-3.60 |
| <60 | Poor | <3.10 |

Mathematically, the E-model is defined as:

$$R=R_o-I_s-I_d-I_e+A \qquad \text{(Equation 8)}$$

where: R: R-factor
$R_o$: Basic Signal to noise ratio
$I_s$: Impairment occurring simultaneously with the voice signal
$I_d$: Impairment caused by one way delay
$I_e$: A combined impairment caused by Codec & packet loss
A: Expectancy Factor According to the teaching of the present invention, the R-factor is preferably calculated based on information regarding the codec, network delay and packet loss obtained from the network, preferably from one or more gateways in the network.

In a preferred embodiment, the codec, network and packet loss information is obtained from Call Detail Records (CDRs) available in one or more Cisco gateways in the network.

Preferably, the information is obtained during the call session. The R-factor and the MOS score are calculated immediately with the obtained information so as to dynamically monitor the call quality during the call. The calculation results are fed back to a management unit for back-end processing, and are used to update routing tables.

Preferably, as soon as the R-factor or MOS score is below a predetermined threshold, a routing engine immediately reroutes the call according to the updated routing tables. Thus, the call can be rerouted in real time during the call session.

FIG. 2 schematically illustrates the steps of a method for managing a voice call over a VOIP network according to a preferred embodiment of the present invention.

The call starts at block 100. After the call is established, information regarding the codec, network delay and packet loss is obtained from the network during the call, at block 101. In a preferred embodiment, such information is obtained from Call Detail Records (CDRs) available in one or more Cisco gateways. A Cisco gateway can either be an originating gateway or a terminating gateway, or both.

R-factor is then calculated based on the obtained information regarding the codec, network delay and packet loss according to a proper formula (examples given in detail below), at block 102. Preferably, MOS is calculated from R-factor according the Equation 1 or Table 1, as explained above.

The calculation results are compared with a predetermined reference value which represents an acceptable voice quality threshold level, at block 103. If R or the MOS is above the threshold, the call is kept in the path without being rerouted, and periodically the steps 101-103 are repeated so as to monitor the call quality. If R or the MOS falls below the threshold, as decided in block 103, the routing table is updated and the call is rerouted, at block 105.

After the call is rerouted, steps 101-104 are repeated to keep monitoring the call, until the call ends at block 105.

A first exemplary embodiment of the method according to the present invention for calculating the R-factor in Equation 8 is now described in detail below. In this embodiment, the information regarding codec, network delay and packet loss is obtained from Cisco CDRs.

Determining A:

The Expectancy Factor A is used to increase the MOS score for destinations with inherent poor quality such as cell phones, hard to reach areas and developing countries. Since customers have come to expect lower quality to these destinations, what might otherwise sound poorly to a "normal" destination is acceptable in these cases. Therefore, in this embodiment according to the present invention, is assumed to be zero "0".

Determining $R_o-I_s$:

$R_o-I_s$ are constants throughout the conversation in the call session, regardless of the transmission medium. In this embodiment, the $R_o-I_s$ is set as follows:

$$R_o-I_s=93.2 \qquad \text{(Constant 1)}$$

Calculating $I_d$:

The impairment factor $I_d$, is a function of the mouth to ear one-way delay d. $I_d$ is calculated from the following equations:

$$I_d=0.024d \text{ if } d=<177.3 \qquad \text{(Equation 9)}$$

$$I_d=0.024+0.11(d-177.3) \text{ if } d>177.3 \qquad \text{(Equation 10)}$$

In this embodiment, the one-way delay d will be an additive delay that includes the codec delay ($d_c$) the network delay ($d_n$) and the jitter buffer delay ($d_j$):

$$d=d_c+d_n+d_j \qquad \text{(Equation 11)}$$

In this embodiment, since $d_n$ can be obtained from Cisco CDRs, the challenge becomes to derive default values for $d_c$ & $d_j$ that are gateway specific. In the lab we set $d_n$ to 0 and assumed $d_c$ and $d_j$ to be a combined constant that does not depend on network conditions.

In a preferred embodiment, we assume the following constants for a network where Cisco gateways are adopted. Although we must make this assumption for simplicity, we need to acknowledge that: 1) $d_j$ varies with network conditions. Models that account for jitter and bursty packet loss are still being researched by the academic community—a few that have been proposed are very complex, given their use of statistical theory; 2)These constants may not be accurate when a non-Cisco device is present in the call flow.

$$dc+dj=94 \text{ ms, for } G.711 \quad \text{(Constant 2)}$$

$$dc+dj=114 \text{ ms, for } G.729 \quad \text{(Constant 3)}$$

$$dc+dj=186 \text{ ms, , for } G.723 \quad \text{(Constant 4)}$$

Since $d_n$ is the network delay as provided by Cisco CDRs, let us rename it as $d_{cdr}$ and $I_d$ now becomes a function of the codec, and network delay. In this embodiment, since the CDR delay is round-trip, it must be halved. $I_d$ can then be shown to be:

$$\text{where: } d=d_{cdr}/2+94 \text{ for } G.711 \text{ codec} \quad \text{(Equation 12)}$$

$$d=d_{cdr}/2+114 \text{ for } G.729 \text{ codec} \quad \text{(Equation 13)}$$

$$d=d_{cdr}/2+186 \text{ for } G.723 \text{ codec} \quad \text{(Equation 14)}$$

It is worth noting two points: 1) The delay introduced by Cisco seems to be excessive but we did verify that the results obtained by Radcom are accurate. This Cisco issue had already been identified in earlier works and has been verified again; 2) The measurements indicate that the delay increases as a function of packet loss as depicted below. This may be a result of varying jitter buffers or other Cisco-specific algorithms.

The impact on delay can be approximated as functions of packet loss (PL), and codec as follows:

$$d_c+d_j=15pl+94 \text{ for } G.711 \text{ and } PL<2\% \quad \text{(Equation 15)}$$

$$d_c+d_j=2pl+125 \text{ for } G.711 \text{ and } PL>=2\% \quad \text{(Equation 16)}$$

$$d_c+d_j=10pl+114 \text{ for } G.729 \text{ and } PL<2\% \quad \text{(Equation 17)}$$

$$d_c+d_j=1.25pl+132.5 \text{ for } G.729 \text{ and } PL>=2\% \quad \text{(Equation 18)}$$

$$d_c+d_j=40pl+186 \text{ for } G.723 \quad \text{(Equation 19)}$$

For simplicity, we have assumed the delay introduced by Cisco to be constant (constant 2, 3 and 4) but this can be modified later if needed.

Calculating $I_e$:

$I_e$ is calculated from the following equations:

$$Ie=40 \ln(1+10PL) \text{ for } G.711 \quad \text{(Equation 20)}$$

$$Ie=11+44 \ln(1+9PL) \text{ for } G.729 \quad \text{(Equation 21)}$$

$$Ie=15+50 \ln(1+8PL) \text{ for } G.723 \quad \text{(Equation 22)}$$

Equations 20, 21 and 22 are derived from curves generated from the G.113 $I_e$ data as listed in Table 2:

TABLE 2

| | G.113 $I_e$ data | | | |
|---|---|---|---|---|
| % PL | G.729 (VAD) | G.723 (VAD) | G.711 w/o PLC | G.711 w/PLC |
| 0 | 11 | 15 | 0 | 0 |
| 0.5 | 13 | 17 | | |
| 1 | 15 | 19 | 25 | 5 |
| 1.5 | 17 | 22 | | |
| 2 | 19 | 24 | 35 | 7 |
| 3 | 23 | 27 | 45 | 10 |
| 4 | 26 | 32 | | |
| 5 | | | 55 | 15 |
| 7 | | | | 20 |
| 8 | 36 | 41 | | |
| 10 | | | | 25 |
| 15 | | | | 35 |

TABLE 2-continued

| | G.113 $I_e$ data | | | |
|---|---|---|---|---|
| % PL | G.729 (VAD) | G.723 (VAD) | G.711 w/o PLC | G.711 w/PLC |
| 16 | 49 | 55 | | |
| 20 | | | | 45 |

Calculating R:

From the above derivations, following equations can be concluded from Equation 8 for calculating R:

for G.711

$$R=93.2-0.024d-40 \ln(1+10PL) \text{ if } d=<177.3 \quad \text{(Equation 2a)}$$

$$R=112.7-0.134d-40 \ln(1+10PL) \text{ if } d>177.3 \quad \text{(Equation 2b)}$$

and $d=d_{cdr}/2+94$ for G.729

$$R=82.2-0.024d-44 \ln(1+9PL) \text{ if } d=<177.3 \quad \text{(Equation 3a)}$$

$$R=101.7-0.134d-44 \ln(1+9PL) \text{ if } d>177.3 \quad \text{(Equation 3b)}$$

and $d=d_{cdr}/2+114$ for G.723

$$R=97.7-0.134d-50 \ln(1+8PL) \quad \text{(Equation 4)}$$

and $d=d_{cdr}/2+186$

Following is a second exemplary embodiment of the method according to the present invention for calculating the R-factor in Equation 8 is now described in detail below. In this embodiment, again the information regarding codec, network delay and packet loss is obtained from Cisco CDRs.

Determining Expectancy Factor A:

Expectancy Factor A is still assumed as "0" in this second embodiment.

Determining $R_o-I_s$:

In this embodiment, $R_o-I_s$ is revised as follows:

$$R_o-I_s=100 \quad \text{(Constant 1—revised)}$$

This is because we realize that is more realistic and practical to assume that under perfect network conditions, where packet loss and delay are non-factors, a "perfect" MOS score of 4.5 will be obtained. If we set MOS equal to 4.5 in Equation 1, then:

$$4.5=1+0.035R+R(R-60)(100-R)7\times 10^{-6} \quad \text{(Equation 23)}$$

In order to satisfy equation 23, the R factor must equal 100. Therefore, by setting $I_d$ and $I_e$ equal to 0 (perfect network conditions where the delay impairment and the codec/packet loss impairments are non-existent) and by setting R to 100 in equation 1, we come up with the revised Constant 1 as above: $R_o-I_s=100$.

Calculating $I_d$:

In the art, the G.107 recommendations define $I_d$ as the delay impairment factor that is in turn subdivided into three factors:

$$I_d=I_{dte}+I_{dle}+I_{dd} \quad \text{(Equation 24)}$$

where: $I_{dte}$ gives an estimate for the impairments due to talker echo $I_{dle}$ gives an estimate for the impairments due to listener echo $I_{dd}$ represents the impairment due to the end-to-end one way delay We must assume that echo chancellors are present in the voice path and that their affects on delay are negligible. Therefore, let us assume $I_{dte}$ and $I_{dle}$ to be 0 and $I_d$ becomes a function of $I_{dd}$ only, which is in turn a function of one-way delay:

$$I_d=0 \text{ for } d<100 \text{ ms}$$

$$I_d=25\{(1+X^6)^{1/6}-3(1+[X/3]^6)^{1/6}+2\} \text{ for } d>100 \text{ ms} \quad \text{(Equation 25)}$$

$$\text{where } X=\log(d/100)/\log 2$$

Because dc+dj is equal to 94 ms (for G.711) or 114 ms (for G.729) or 186 ms (for G.723) (see Constants 2, 3 and 4), we can therefore assume d to always be greater than 100 ms (even for G.711 codec, where the native codec delay is 94 ms, we can safely assume that network delay $d_{cdr}$ will be greater than 12 ms) and Equation 25 applies for all codecs and network conditions.

Calculating $I_e$:

Same as in the first exemplary embodiment, $I_e$ is calculated from the following equations:

$$Ie=40\ln(1+10PL) \text{ for } G.711 \quad \text{(Equation 20)}$$

$$Ie=11+44\ln(1+9PL) \text{ for } G.729 \quad \text{(Equation 21)}$$

$$Ie=15+50\ln(1+8PL) \text{ for } G.723 \quad \text{(Equation 22)}$$

Calculating R:

From the above derivations, following equations can be concluded from Equation 8 for calculating R:

for G.711

$$R=100-25\{(1+X^6)^{1/6}-3(1+[X/3]^6)^{1/6}+2\}-[0+40\ln(1+10PL)] \quad \text{(Equation 5)}$$

$$\text{where } X=\log(d/100)/\log 2 \text{ and } d=d_{cdr}/2+94$$

for G.729

$$R=100-25\{(1+X^6)^{1/6}-3(1+[X/3]^6)^{1/6}+2\}-[11+44\ln(1+9PL)] \quad \text{(Equation 6)}$$

$$\text{where } X=\log(d/100)/\log 2 \text{ and } d=d_{cdr}/2+114$$

for G.723

$$R=100-25\{(1+X^6)^{1/6}-3(1+[X/3]^6)^{1/6}+2\}-[15+50\ln(1+8PL)] \quad \text{(Equation 7)}$$

$$\text{where } X=\log(d/100)/\log 2 \text{ and } d=d_{cdr}/2+186$$

Though the above has described the preferred embodiment of the present invention, it shall be understood that numerous adaptations, modifications and variations are possible to those skilled in the art without departing the gist of the present invention. For example, the information regarding the codec, network delay and packet loss can be periodically and/or dynamically obtained from the network. In stead from a Cisco CDRs, the information may be obtained from other types of gateways or devices in the network. Moreover, the present invention may be applied to voice calls over packet network using other protocols as well, such as SIP protocol. Therefore, the scope of the present invention is solely intended to be defined by the accompanying claims.

What is claimed is:

1. A method for managing a voice call over an internet packet network, comprising:
   obtaining information regarding codec, network delay and packet loss;
   calculating a parameter representing voice quality of the call based on the obtained information; and
   rerouting the voice call through the internet packet network if the parameter is below a predetermined value, said parameter being a Mean Opinion Score (MOS), calculated based upon an R-factor, said R-factor being determined as follows:

for G.711

$$R=93.2-0.024d-40\ln(1+10PL) \text{ if } d=<177.3 \quad \text{(Equation 2a)}$$

$$R=112.7-0.134d-40\ln(1+10PL) \text{ if } d>177.3 \quad \text{(Equation 2b)}$$

$$\text{and } d=d_{cdr}/2+94$$

for G.729

$$R=82.2-0.024d-44\ln(1+9PL) \text{ if } d=<177.3 \quad \text{(Equation 3a)}$$

$$R=101.7-0.134d-44\ln(1+9PL) \text{ if } d>177.3 \quad \text{(Equation 3b)}$$

$$\text{and } d=d_{cdr}/2+114$$

for G.723

$$R=97.7-0.134d-50\ln(1+8PL) \quad \text{(Equation 4)}$$

$$\text{and } d=d_{cdr}/2+186$$

wherein d is a one way delay, $d_{cdr}$ is a delay measured by reading from a gateway computer, and PL is a packet loss.

2. A method of managing a voice call over a packet computer network, comprising:
   obtaining information regarding codec, network delay, and packet loss;
   calculating a parameter representing voice quality of the call based on the obtained information; and
   rerouting the voice call through the packet computer network if the parameter is below a predetermined value, wherein the parameter comprises a Mean Opinion Score (MOS) calculated based on an R-factor, said R-factor being determined as follows:

for G.711

$$R=100-25\{(1+X^6)^{1/6}-3(1+[X/3]^6)^{1/6}+2\}-[0+40\ln(1+10PL)] \quad \text{(Equation 5)}$$

$$\text{where } X=\log(d/100)/\log 2 \text{ and } d=d_{cdr}/2+94$$

for G.729

$$R=100-25\{(1+X^6)^{1/6}-3(1+[X/3]^6)^{1/6}+2\}-[11+44\ln(1+9PL)] \quad \text{(Equation 6)}$$

$$\text{where } X=\log(d/100)/\log 2 \text{ and } d=d_{cdr}/2+114$$

for G.723

$$R=100-25\{(1+X^6)^{1/6}-3(1+[X/3]^6)^{1/6}+2\}-[15+50\ln(1+8PL)] \quad \text{(Equation 7)}$$

$$\text{where } X=\log(d/100)/\log 2 \text{ and } d=d_{cdr}/2+186$$

wherein d is a one way delay, $d_{cdr}$ is a delay measured by reading from a gateway computer, and PL is a packet loss.

3. A method for determining voice quality of a call over a computerized internet packet network, comprising steps of:
   obtaining information regarding codec, network delay and packet loss; and
   calculating a parameter representing the voice quality based on the obtained information, said parameter comprising a Mean Opinion Score (MOS), said MOS being obtained from an R-factor, said R-factor is obtained from the following equations:

for G.711

$$R = 93.2 - 0.024d - 40 \ln(1+10PL) \text{ if } d = <177.3 \quad \text{(Equation 2a)}$$

$$R = 112.7 - 0.134d - 40 \ln(1+10PL) \text{ if } d > 177.3 \quad \text{(Equation 2b)}$$

and $d = d_{cdr}/2 + 94$ for G.729

$$R = 82.2 - 0.024d - 44 \ln(1+9PL) \text{ if } d = <177.3 \quad \text{(Equation 3a)}$$

$$R = 101.7 - 0.134d - 44 \ln(1+9PL) \text{ if } d > 177.3 \quad \text{(Equation 3b)}$$

and $d = d_{cdr}/2 + 114$ for G.723

$$R = 97.7 - 0.134d - 50 \ln(1+8PL) \quad \text{(Equation 4)}$$

and $d = d_{cdr}/2 + 186$;

wherein d is a one way delay, $d_{cdr}$ is a delay measured by reading from a gateway computer, and PL is a packet loss.

4. A method for determining voice quality of a call over a computerized internet packet network, comprising steps of:

obtaining information regarding codec, network delay and packet loss; and calculating a parameter representing the voice quality based on the obtained information, said parameter comprising a Mean Opinion Score (MOS), said MOS being obtained from an R-factor, said R-factor being obtained from following equations:

for G.711

$$R = 100 - 25\{(1+X^6)^{1/6} - 3(1+[X/3]^6)^{1/6} + 2\} - [0 + 40 \ln(1+10PL)] \quad \text{(Equation 5)}$$

where $X = \log(d/100)/\log 2$ and $d = d_{cdr}/2 + 94$ for G.729

$$R = 100 - 25\{(1+X^6)^{1/6} - 3(1+[X/3]^6)^{1/6} + 2\} - [11 + 44 \ln(1+9PL)] \quad \text{(Equation 6)}$$

where $X = \log(d/100)/\log 2$ and $d = d_{cdr}/2 + 114$ for G.723

$$R = 100 - 25\{(1+X^6)^{1/6} - 3(1+[X/3]^6)^{1/6} + 2\} - [15 + 50 \ln(1+8PL)] \quad \text{(Equation 7)}$$

where $X = \log(d/100)/\log 2$ and $d = d_{cdr}/2 + 186$ wherein d is a one way delay, $d_{cdr}$ is a delay measured by reading from a gateway computer, and PL is a packet loss.

\* \* \* \* \*